June 29, 1943.   W. E. PATTEN   2,323,099
TUBE FITTING
Filed Dec. 5, 1941
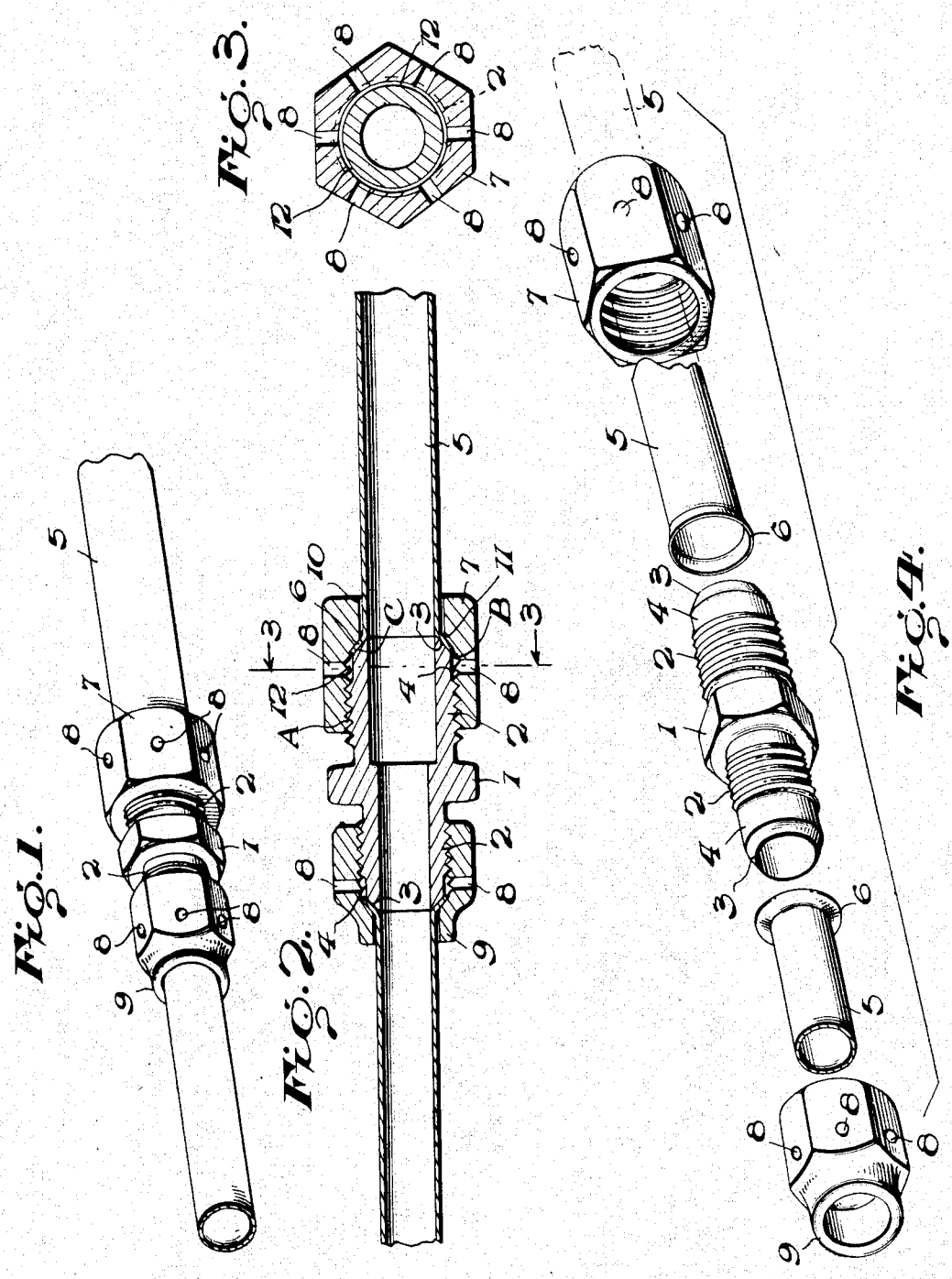
Inventor
Walter Evans Patten
By
Attorney Patented June 29, 1943

2,323,099

UNITED STATES PATENT OFFICE 2,323,099

TUBE FITTING

Walter Evans Patten, Catonsville, Md.

Application December 5, 1941, Serial No. 421,817

1 Claim. (Cl. 285—86)

My invention relates to a coupling for thin wall tubes used in refrigerator systems in which tubes are subjected to freezing and thawing, said tubes being used for circulating the refrigerating medium, which tubes are connected to pumps, et cetera.

The object of my invention is to prevent the entrance of moisture into a previously dry system via the fitting.

A further object of my invention is to prevent the two members of the fitting from unscrewing and allowing the escape of the refrigerant.

A further object of my invention is to facilitate detection of small leakage at a defective fitting, which leakage otherwise would escape notice; and with these and other objects in view my invention consists of the parts and combination of parts hereinafter set forth.

In the drawing:

Figure 1 is a perspective view of the coupling embodying my invention.

Figure 2 is a vertical transverse sectional view of my improved coupling.

Figure 3 is a detail sectional view on the line 3—3 of Figure 2.

Figure 4 is a view similar to Figure 1, showing the parts of the coupling separated and in position for assembling.

The reference numeral 1 designates the coupler fitting member provided with screw threads 2, which extend from the central portion of the fitting, but terminate short of the ends of the fitting. The extreme ends of the fitting are provided with beveled seats 3. Between the bevel seats 3 and the outer ends of the thread 2 a plane smooth cylindrical surface 4, to be hereinafter referred to, is provided. The thin wall tubes 5 are flared, as at 6, at the ends of which are to be gripped between the two members of the coupling.

The coupling nut 7 is provided with internal threads which are designed to intermesh with the threads 2 of the coupling fitting. I provide these nuts with a plurality of exit ports 8 which extend from the interior of the nut to the exterior thereof. The nut 7, as clearly shown in Figure 2, near its outer end, is of slightly greater diameter than the diameter of the thin wall tube 5, thereby providing a space 10 between that portion of the nut and the tube.

The flared end 6 of the thin wall tube is seated on the seat 3 of the fitting 1, whereupon the nut 7 is screwed upon the fitting until the shoulder 11 of the nut engages the flared end 6 of the tube 5, and further manipulation of the nut firmly clamps and seals the flared end of the tube on the seat 3 of the fitting, and the parts are retained in this assembled position by the frictional force set up between the threads of the fitting and the nut.

When this coupling is subjected to alternate freezing and thawing temperature, as when used in refrigerating systems to attach thin wall tubing conducting refrigerant to valves and other elements, moisture from condensation, or other source, enters the clearance between the screw threads and continues by capillary attraction along the threads to eventually fill all space between the nut and the fitting during the thawing half cycle.

When the freezing half cycle occurs the small volume of moisture between the threads solidifies approximately at A, and seals the comparatively large volume of moisture in the space B adjacent to the tube end. The subsequent freezing of this confined moisture then expands to exert a great force against the nut and the fitting.

Over a period of time the primary effect of this repeated force is to progressively deform the weaker member of the coupling, thereby diminishing the clamping action of the coupling on the flared end 6 of tube 5, so that during the freezing period the force of the expanding moisture at B needs only to deflect either the nut or the fitting to temporarily release the clamping action of the coupling on flared end 6 of tube 5 and permit a portion of the expanding moisture at B to be extruded, by force of expansion, at C between flared end 6 and beveled face 3 to enter tube and mix with refrigerant therein.

This expulsion from the coupling of the volumetric increment of the moisture due to freezing, diminishes the deflecting force on the coupling and the seal on flared end 6 may be reestablished until the next freezing. Moisture accumulating in the refrigerating system from these periodic injections by the coupling, results in material damage and corrosion of vital parts in addition to operating difficulties which will require stopping the operation of the refrigerating system until means for moisture removal can be provided.

This progressive deformation due to the exerted forces mentioned eventually destroys permanently the seal between the tube and coupling and the refrigerant formerly confined in the tube will escape.

When tube 5 is expanded to form flare 6 an incipient split or partial fracture is likely to occur particularly if metal of tube is lacking in ductility. Under the pressures exerted the incipient fracture will be rendered complete and a crevice will be formed in the flare adjacent to seat 3 of fitting, so that the seal between the flare 6 and seat 3 will be broken and will permit substance confined in tube to escape to atmosphere along clearance between screw threads. The rate of escape of confined substance along thread clearance is so restricted by small area of clearance between threads that leakage escapes detection.

To overcome these known defects I provide the nut or external member with ports or vents 8 which communicate with the annular space 12, formed between the nut and the plane face 4, of the fitting member, the ports 8 at their outer end being open to atmosphere, whereby force exerted by freezing of moisture in space 12 is free to expand to atmosphere, thereby eliminating all damage by nut or fitting becoming deformed, and at the same time insuring the maintenance of a tight seal between the flared end of the thin wall tube and the coupling and a tight connection between the threaded parts of the coupling; and in event should a seal fail to be established due to a defective or split flare 6, confined substance will pass to annular space 12 and emerge through ports 8 unrestrained and in sufficient quantity to permit positive detection.

It will be observed that in my improved construction of coupling the coupling members 1 is provided with an inner threaded portion 2, a beveled end portion 3 and an intervening reduced cylindrical portion 4 which is of less diameter than the threaded portion 2, while the coacting nut 7 is provided with a threaded portion to engage the threads 12, a beveled surface to engage and clamp the flared portion of the tube against the beveled end portion 3, and radial openings 8 which lie between said threaded and beveled surfaces of the nut. Thus when the parts are coupled together the reduced portion 4 of the member 2 is spaced from the opposed surface of the nut through which the openings 8 extend and forms therewith an expansion channel with which the expansion openings 8 communicate. This channel and the openings are accordingly disposed between the threaded engaging surfaces and the sealing surfaces and lie on the inner side of the latter. As a result, the channel and openings 8 are arranged to allow escape to the atmosphere of moisture entering either between the screw threads or between the surfaces of the seal and expansion to the atmosphere of those forces created at either point A or point C, whereby to prevent freezing of any considerable amount of moisture at either of these points. By this means any moisture collecting about the seal is allowed to escape without entering the tube, while any moisture collecting between the threads is allowed to escape to prevent the creation of any force liable to break the seal.

What I claim is:

In a coupling for a thin walled tube subjected in use to freezing and thawing temperatures, a tube having a flanged end, a fitting having a threaded surface, a beveled end portion forming a seat and an intermediate portion reduced in diameter with respect to the threaded surface and located between the same and the beveled end portion, and a nut having a threaded surface to engage the threaded surface of the fitting and a beveled surface to engage the flanged end of the tube and clamp the same against the beveled end portion of the fitting so as to form a seal, a portion of the surface of the nut cooperating with the portion of reduced diameter of the fitting to form an expansion channel therebetween, and said nut being provided with radial openings to connect said channel with the atmosphere, the said channel and openings being arranged on the inner side of said seal and between the same and the engaged threaded surfaces of the fitting and nut.

WALTER EVANS PATTEN.